United States Patent
Chiu et al.

(10) Patent No.: US 11,326,072 B2
(45) Date of Patent: May 10, 2022

(54) HIGH HARDNESS FLEXIBLE HARD COATING FILM

(71) Applicant: BenQ Materials Corporation, Taoyuan (TW)

(72) Inventors: Chia-Ling Chiu, Taoyuan (TW); Ching-Huang Chen, Taoyuan (TW); Kuo-Hsuan Yu, Taoyuan (TW)

(73) Assignee: BenQ Materials Corporation, Taoyuan (TW)

( * ) Notice: Subject to any disclaimer, the term of this patent is extended or adjusted under 35 U.S.C. 154(b) by 244 days.

(21) Appl. No.: 16/699,794

(22) Filed: Dec. 2, 2019

(65) Prior Publication Data
US 2021/0079254 A1    Mar. 18, 2021

(30) Foreign Application Priority Data

Sep. 12, 2019   (TW) .................. 108133047

(51) Int. Cl.
| | | |
|---|---|---|
| *C09D 133/14* | (2006.01) | |
| *C09D 7/62* | (2018.01) | |
| *C08F 220/34* | (2006.01) | |
| *C08K 3/36* | (2006.01) | |
| *G02B 1/14* | (2015.01) | |
| *C09D 7/40* | (2018.01) | |
| *C08K 9/04* | (2006.01) | |

(52) U.S. Cl.
CPC .......... *C09D 133/14* (2013.01); *C08F 220/34* (2013.01); *C08K 3/36* (2013.01); *C08K 9/04* (2013.01); *C09D 7/62* (2018.01); *C09D 7/67* (2018.01); *G02B 1/14* (2015.01); *C08F 2800/20* (2013.01); *C08K 2201/005* (2013.01); *C08K 2201/006* (2013.01); *C08K 2201/011* (2013.01)

(58) Field of Classification Search
CPC .......... C09D 133/14; C09D 7/62; C09D 7/67; C09D 135/02; C08F 220/34; C08F 2800/20; C08F 222/1065; C08K 3/36; C08K 9/04; C08K 2201/005; C08K 2201/011; C08K 2201/006; G02B 1/14
See application file for complete search history.

(56) References Cited

U.S. PATENT DOCUMENTS

| | | | | |
|---|---|---|---|---|
| 11,091,607 | B2 * | 8/2021 | Tadiello | C09C 1/30 |
| 2012/0012557 | A1 * | 1/2012 | David | H01L 31/0236 |
| | | | | 216/71 |
| 2014/0178692 | A1 * | 6/2014 | Haubrich | C09D 133/14 |
| | | | | 428/412 |
| 2016/0237311 | A1 * | 8/2016 | Mizori | C08K 5/5419 |
| 2018/0179445 | A1 * | 6/2018 | Inada | C09K 19/56 |

FOREIGN PATENT DOCUMENTS

TW    201925367 A    7/2019

OTHER PUBLICATIONS

Ding, machine English translation of CN 107164032 (Year: 2017).*
Szwarc-Rzepka et al., "Preparation and Physicochemical Properties of Functionalized Silica/Octamethacryl-Silsesquioxane Hybrid Systems," vol. 2013, Article ID 674237 (Year: 2013).*

* cited by examiner

*Primary Examiner* — Jessica M Roswell

(57) ABSTRACT

A high hardness flexible hard coating film is disclosed. The high hardness flexible hard coating film comprises a substrate film and a hard coating layer. The hard coating layer comprises a (meth)acrylate binder and reactive silica nanoparticles, wherein the reactive silica nanoparticles comprise reactive (meth)acrylate modified silica nanoparticles and reactive (meth)acrylate-polyhedral oligomeric silsesquioxane (POSS) modified silica nanoparticles. The high hardness flexible hard coating film will not crack or fracture under an dynamic inward folding test for performing 180° bend testing at a radius of 1 mm with $2\times10^5$ times, and the pencil hardness (JIS K 5400) thereof is 6H or more.

12 Claims, No Drawings

HIGH HARDNESS FLEXIBLE HARD COATING FILM

CROSS-REFERENCE TO RELATED APPLICATION

This application claims the priority benefit of Taiwanese application serial No. 108133047, filed on Sep. 12, 2019, which is incorporated herein by reference.

BACKGROUND

Technical Field

The present invention relates to a high hardness flexible hard coating film for foldable display, and particularly relates to a hard coating film with a high hardness and a good flexibility even in a low thickness.

Background of the Invention

Recently, with the development of flexible displays, the optical film used in flexible display is required to have a good hardness and a durable flexibility for repeatedly folding and unfolding without any crack or break. However, the hardness and flexibility are contradictory properties in the optical film. In the state of the optical film art, an optical film usually has a high hardness but a low flexibility or has a high flexibility but a low hardness, the hardness and the flexibility cannot meet the requirement at the same time. For example, a hard coating solution of polyhedral oligomeric silsesquioxane compound, methacrylate oligomer and acrylate monomer was suggested coating on a transparent base film to form a hard coating layer with a thickness of 30 μm and with a pencil hardness of 7H, but the hard coating film comprising polyhedral oligomeric silsesquioxane compound fails to provide a desired flexibility.

The hardness of the hard coating layer coated on an optical film is positively relevant to the thickness thereof, that is, the hardness can be enhanced by increasing the thickness of the hard coating layer. It has been suggested that coating layers with different thicknesses are applied on the bend portion and the non-bend portion of an optical film to achieve the desired foldability thereof. In the state of the art, a hard coating film stacked with coating layers of different hardness and a composite coating structure of organic layer and inorganic layer are also proposed to reach the required surface hardness and the flexibility.

For providing an optical film with a high hardness and a good flexibility, several solutions have been proposed, for example, multi-coating application, high coating thickness, various coating thicknesses or inorganic deposition layer. However, the proposed technical solutions are costly or consume high energy and adversely to the foldability of the film.

Therefore, a hard coating film with a high hardness and a good flexibility for a foldable display is highly expected.

SUMMARY OF THE INVENTION

The present invention is to provide a high hardness flexible hard coating film for a foldable display. The present high hardness flexible hard coating film exists no crack or break at the bending part after the dynamic inward foldability test is performed for $2 \times 10^5$ times with radius of 1 mm at an angle of 180° and has a pencil hardness (JIS K 5400) of 6H or higher in a low thickness. The present high hardness flexible hard coating film comprises a base film and a hard coating layer, wherein the hard coating layer comprises an acrylate binder resin and reactive silica nanoparticles, wherein the reactive silica nanoparticles comprises reactive (meth)acrylate-modified silica nanoparticles and reactive (meth)acrylate-polyhedral oligomeric silsesquioxane (POSS)-modified silica nanoparticles.

In a preferred embodiment of the high hardness flexible hard coating film of the present invention, the reactive silica nanoparticles in the hard coating layer comprises 20 weight percent (wt %) to 40 wt % of reactive (meth)acrylate-modified silica nanoparticles and 5 wt % to 40 wt % of reactive (meth)acrylate-POSS-modified silica nanoparticles, and the total amount of the reactive silica nanoparticles is in the range of 30 wt % to 60 wt %.

In a preferred embodiment of the high hardness flexible hard coating film of the present invention, the mean primary particle diameter by specific surface area (BET) of the reactive (meth)acrylate-modified silica nanoparticles in the hard coating layer is preferably in the range of 10 nm to 70 nm.

In a preferred embodiment of the high hardness flexible hard coating film of the present invention, the BET mean primary particle diameter of the (meth)acrylate-POSS-modified silica nanoparticles in the hard coating layer is preferably in the range of 10 nm to 60 nm.

In a preferred embodiment of the high hardness flexible hard coating film of the present invention, the thickness of the hard coating layer is in the range between 2 μm to 30 μm.

In a preferred embodiment of the high hardness flexible hard coating film of the present invention, the acrylic binder resin comprises a (meth)acrylate composition and an initiator, wherein the (meth)acrylate composition comprises an urethane (meth)acrylate oligomer with a functionality of 6 to 15; a (meth)acrylate monomer with a functionality of 3 to 6; and a (meth)acrylate monomer with a functionality of less than 3, wherein the average molecular weight of the urethane (meth)acrylate oligomer is between 1,000 and 4,500.

A further object of the present invention is to provide a display comprising a high hardness flexible hard coating film.

The above and other aspects of the invention will become better understood with regard to the following detailed description of the preferred but non-limiting embodiment(s). These and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be affected without departing from the spirit and scope of the novel concepts of the disclosure.

DETAILED DESCRIPTION OF THE INVENTION

In the following detailed description, for purposes of explanation, numerous specific details are set forth in order to provide a thorough understanding of the disclosed embodiments. It will be apparent, however, that one or more embodiments may be practiced without these specific details.

It is apparent that departures from specific designs and methods described and shown will suggest themselves to those skilled in the art and may be used without departing from the spirit and scope of the invention. The present invention is not restricted to the particular constructions described and illustrated, but should be construed to cohere with all modifications that may fall within the scope of the appended claims.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art.

The term "(meth)acrylate" used herein refers to acrylate or (meth)acrylate.

The present invention is to provide a high hardness flexible hard coating film. The present hard coating film exists no crack or break at the bending part after the dynamic inward foldability test is performed for $2 \times 10^5$ times with radius of 1 mm at an angle of 180° and has a pencil hardness (JIS K 5400) of 6H or higher in a low thickness. The present high hardness flexible hard coating film comprises a base film and a hard coating layer, wherein the hard coating layer comprises acrylate binder resin and reactive silica nanoparticles, wherein the reactive silica nanoparticles comprise reactive (meth)acrylate-modified silica nanoparticles and reactive (meth)acrylate-polyhedral oligomeric silsesquioxane (POSS)-modified silica nanoparticles.

The present invention discloses a high hardness flexible hard coating film comprising a base film and a hard coating layer on the base film. In an embodiment of the present invention, the suitable base film is a base film with good hardness, light transmittance and foldable property. For example, the base film can be polyimide film, polyamidoamine film, polyamide film, polyester film, for example, polyethylene terephthalate film or polyethylene naphthalate film. In a preferred embodiment of the present invention, the base film can be a polyimide film or a polyamide film.

In an embodiment of the present invention, the suitable base film for the high hardness flexible hard coating film have a light transmittance of more than 80% and preferably a light transmittance of more than 88%, and the thickness thereof is in the range of 10 μm to 100 μm, and preferably in the range of 20 μm to 80 μm.

In an embodiment of the present invention, the hard coating layer comprises an acrylate binder resin and reactive silica nanoparticles, wherein reactive silica nanoparticles comprise 20 wt % to 40 wt % of reactive (meth)acrylate-modified silica nanoparticles and 5 wt % to 40 wt % of reactive (meth)acrylate-POSS-modified silica nanoparticles, and the total amount of the silica nanoparticles is in the range of 30 wt % to 60 wt %.

In the high hardness flexible hard coating film of the present invention, the reactive silica nanoparticles with different surface modifications are used to enhance the synergistic effect on the hardness and flexibility of the hard coating layer, that is, the pencil hardness (JIS K 5400) thereof is 6H or higher in a low thickness and no crack or break is formed at the bending part after the dynamic inward foldability test is performed for $2 \times 10^5$ times with radius of 1 mm at an angle of 180°.

In a preferred embodiment of the high hardness flexible hard coating film of the present invention, the BET mean primary diameter of the reactive (meth)acrylate-modified silica nanoparticles in the hard coating layer is in the range of 10 nm to 70 nm, and preferably in the range of 10 nm to 50 nm and more preferably in the range of 10 nm to 30 nm. When the BET mean primary diameter of the (meth)acrylate-modified silica nanoparticles is more than 70 nm, the haze of the hard coating film will increase.

In a preferred embodiment of the high hardness flexible hard coating film of the present invention, the reactive (meth)acrylate-modified silica nanoparticles in the hard coating layer can be in spherical shape or in amorphous shape and preferably is the spherical reactive (meth)acrylate-modified silica nanoparticles.

In a preferred embodiment of the high hardness flexible hard coating film of the present invention, the reactive (meth)acrylate-modified silica nanoparticles in the hard coating layer is present in the amount of 20 wt % to 40 wt %, and preferably in the amount of 25 wt % to 35 wt %.

In a preferred embodiment of the high hardness flexible hard coating film of the present invention, the reactive (meth)acrylate-POSS-modified silica nanoparticles in the hard coating layer are silica nanoparticles modified with cage-POSS and the reactive (meth)acrylate groups attached at the corners of the cage as a hybrid molecule on the particle surface. In a preferred embodiment of the high hardness flexible hard coating film of the present invention, the silica nanoparticles of the hybrid molecule-modified silica nanoparticles preferably have a mean primary diameter of 20 nm. As the hybrid molecule-modified silica nanoparticles and (meth)acrylate-modified silica nanoparticles are both present in the hard coating layer, lots of polyhedral oligomeric silsesquioxane reactive functional groups of the hybrid molecule-modified silica nanoparticles enable to enhance the crosslinking density in part of the hard coating layer to increase the hardness but to keep the flexibility of the hard coating film.

In a preferred embodiment of the high hardness flexible hard coating film of the present invention, the reactive (meth)acrylate-polyhedral oligomeric silsesquioxane-modified silica nanoparticles in the hard coating layer is present in the amount of 5 wt % to 40 wt %, preferably in the amount of 10 wt % to 35 wt %, and more preferably in the amount of 10 wt % to 30 wt %.

The hardness of the high hardness flexible hard coating film of the present invention is related to the thickness of the hard coating layer on the base film. As the thickness of the hard coating layer is 2 μm, the hardness of the present hard coating film (JIS K5400, load: 750 g) can reach 6H; as the thickness of the hard coating layer is 14 μm, the hardness of the hard coating film can reach 8H; and as the thickness of the hard coating layer is 25 μm, the hardness of the hard coating film can reach 9H. Thus, the hardness of the present high hardness flexible hard coating film can be tailored by adjusting the thickness of the hard coating layer.

The high hardness flexible hard coating film disclosed in the present invention provides a high hardness and high flexibility. When the thickness of the hard coating layer in the high hardness flexible hard coating film is 2 μm, the film fixed on the endurance testing machine in a distance of 2 mm, that is, radius of 1 mm (R=1 mm) was folded at an angle of 180° and then unfolded for $2 \times 10^5$ times, no crack or break was formed at the bending part in the tests In an embodiment of the high hardness flexible hard coating film of the present invention, the fluoro- or silicone-type leveling agent can be optionally added into the hard coating layer. The hard coating layer with a leveling agent can impart stable coatability, and yield the surface of the hard coating layer with the properties of good surface lubricity, anti-fouling and scratch resistance during coating or dry curing. The leveling agent can be used in the present hard coating film can be, for example, polysiloxane or fluorine-based surfactants, and preferably the polyether-modified silicone or perfluoro polyether surfactant.

In an embodiment of the high hardness flexible hard coating film of the present invention, the leveling agent used in the hard coating layer is in an amount from 0.1 weight parts to 1 weight parts per 100 weight parts of the acrylate binder resin, and preferably from 0.2 weight parts to 0.7 weight parts.

In the high hardness flexible hard coating film of the present invention, the acrylate binder resin used in the hard coating layer comprises a (meth)acrylate composition and an initiator, wherein the (meth)acrylate composition comprises a polyurethane (meth)acrylate oligomer with a functionality of 6 to 15, at least one (meth)acrylate monomer with a functionality of 3 to 6, at least one (meth)acrylate monomer with a functionality of less than 3, wherein the average molecular weight of the polyurethane (meth)acrylate oligomer is ranging between 1,000 and 4,500.

In a preferred embodiment of the present invention, the (meth)acrylate composition of the acrylate binder resin comprises 35 to 50 weight parts of the urethane (meth) acrylate oligomer with a functionality of 6 to 15, 12 to 20 weight parts of the at least one (meth)acrylate monomer with a functionality of 3 to 6, and 1.5 to 12 weight parts of the at least one (meth)acrylate monomer with a functionality of less than 3.

In an embodiment of the present invention, the number molecular weight of the urethane (meth)acrylate oligomer with a functionality of 6 to 15 is no less than 1,000 and preferably between 1,500 and 4,500. In a preferred embodiment of the present invention, the urethane (meth)acrylate oligomer with a functionality of 6 to 15 is preferably an aliphatic urethane (meth)acrylate oligomer with the functionality of 6 to 15.

In an embodiment of the present invention, the number molecular weight of the (meth)acrylate monomer with a functionality of 3 to 6 is less than 1,000 and preferably less than 800. The suitable (meth)acrylate monomer with a functionality of 3 to 6 used in the present invention can be, but not limited to, for example, selected from at least one of the group consisting of pentaerythritol tetra(meth)acrylate (PETT(M)A), dipentaerythritol penta(meth)acrylate (DPP(M)A), dipentaerythritol hexa(meth)acrylate (DPH(M)A), trimethylolpropane tri(meth)acrylate (TMPT(M)A), ditrimethylolpropane tetra(meth)acrylate (DTMPT(M)A), pentaerythritol tri(meth)acrylate (PET(M)A) or the combination thereof. The (meth)acrylate monomer with a functionality of 3 to 6 can be preferably the one of pentaerythritol triacrylate (PETA), dipentaerythritol hexaacrylate (DPHA) and dipentaerythritol pentaacrylate (DPPA), or combinations thereof.

In an embodiment of the present invention, the (meth) acrylate monomer with functionality of less than 3 can be a (meth)acrylate monomer with a functionality of 1 or 2 and a molecular weight of less than 500. The suitable (meth)acrylate monomer with functionality of less than 3 for the present invention can be but not limited to, for example, selected from at least one of the group consisting of 2-ethylhexyl (meth)acrylate (2-EH(M)A), 2-hydroxyethyl (meth) acrylate (2-HE(M)A), 2-hydroxypropyl (meth)acrylate (2-HP(M)A), 2-hydroxybutyl (meth)acrylate (2-HB(M)A), 2-butoxyethyl (meth)acrylate, 1,6-hexanediol di(meth)acrylate (HDD(M)A), cyclic trimethylolpropane formal (meth) acrylate (CTF(M)A), 2-phenoxyethyl (meth)acrylate (PHE(M)A), tetrahydrofurfuryl (meth)acrylate (THF(M)A), lauryl (meth)acrylate (L(M)A), diethylene glycol di(meth) acrylate (DEGD(M)A), dipropylene glycol di(meth)acrylate (DPGD(M)A), tripropylene glycol di(meth)acrylate (TPGD(M)A), isobornyl (meth)acrylate (IBO(M)A) or the combination thereof. The (meth)acrylate monomer with functionality of less than 3 can be preferably the one of isobornyl acrylate (IBOA), 1,6-hexanediol diacrylate (HDDA), cyclic trimethylolpropane formal acrylate (CTFA), 2-phenoxyethylacrylate (PHEA) or the combination thereof.

The initiators suitably used in the acrylate binder resin of the present invention can be those commonly used in the related art, such as, for example, but not limited to, acetophenones, diphenylketones, propiophenones, benzophenones, α-hydroxyketones, fluorenylphosphine oxides or the like. These initiators can be used alone or together.

In another embodiment of the present invention, the acrylate binder resin can be optionally added with an antistatic agent, a colorant, a flame retardant, a UV absorber, an antioxidant, a surface modifier and the like.

The high hardness flexible hard coating film of the present invention can be optionally further coated with other optical functional layer, such as a low refractive layer to provide anti-reflection.

The method for preparing the high hardness flexible hard coating film of the present invention comprises the steps of mixing a (meth)acrylate composition comprises a urethane (meth)acrylate oligomer with a functionality of 6 to 15, at least one (meth)acrylate monomer with a functionality of more than 3, at least one (meth)acrylate monomer with functionality of less than 3, an initiator and adequate solvent(s) and stirring evenly for preparing a acrylate binder resin; adding reactive silica nanoparticles, a leveling agent and an organic solution into the acrylate binder resin and stirring thoroughly for preparing a hard coating solution; coating the hard coating solution on a base film; drying the base film coated with hard coating solution in an oven, and curing by radiation or electron beam for forming a hard coating layer on the base film to obtain a high hardness flexible hard coating film.

The solvents suitable used in the method for preparing the high hardness flexible hard coating film of the present invention can be the organic solvents commonly used in the related art, such as ketones, aliphatic, cycloaliphatic or aromatic hydrocarbons, ethers, esters or alcohols. The present hard coating solution can use one or one more organic solvents. The suitable solvents can be such as, acetone, butanone, cyclohexanone, methyl isobutyl ketone, hexane, cyclohexane, dichloromethane, dichloroethane, toluene, xylene, propylene glycol methyl ether, methyl acetate, ethyl acetate, acetic acid propyl ester, butyl acetate, n-butanol, isobutanol, isopropanol, diacetone alcohol, propylene glycol methyl ether acetate, cyclohexanol or tetrahydrofuran and the like.

The present hard coating solution can be applied to the base film by any usual method in the related art, for example, bar coating, doctor blade coating, dip coating, roll coating, spinning coating, slot-die coating and the like.

The present invention will be described below with reference to Examples to describe the present invention in detail but the present invention is not limited to the description thereof.

EXAMPLE

Preparation Example 1: Preparation of Acrylate Binder Resin I 42 weight parts of urethane acrylate oligomer (functionality 6, molecular weight of about 2,600, viscosity of 62,000 cps (25° C.), commercially obtained from Miwon Specialty Chemical Co., Ltd, Korea), 4.5 weight parts of PETA, 12 weight parts of DPHA, 3 weight parts of IBOA, 4 weight parts of photoinitiator (Chemcure-481, commercially obtained from Chembridge, Taiwan), 24.5 weight parts of ethyl acetate (EAC) and 10 weight parts of n-butyl acetate (nBAC) were mixed and stirred for 1 hour to prepare an acrylate binder resin I.

Preparation Example 2: Preparation of Acrylate Binder Resin II 39 weight parts of urethane acrylate oligomer (functionality 9, molecular weight about 2,000, viscosity of about 86,000 cps (at 25° C.), commercially obtained from Allnex, USA), 4.5 weight parts of PETA, 10.5 weight parts of DPHA, 4.5 weight parts of HDDA, 1.5 weight parts of PHEA, 3.5 weight parts of photoinitiator (Chemcure-481, commercially obtained from Chembridge, Taiwan), 0.5 weight parts of photoinitiator (TR-PPI-one, Tronly New Electronic Materials, Hong Kong), 24.5 weight parts of ethyl acetate (EAC) and 10 weight parts of n-butyl acetate (nBAC) were mixed and stirred for 1 hour to prepare an acrylate binder resin II.

Example 1: Preparation of the Hard Coating Film 610 weight parts of the acrylate binder resin I of Preparation Example 1 was mixed with 385 weight parts of a reactive methacrylate-modified silica nanoparticles dispersion (MEK-AC-2140Z, BET particle size of 10-15 nm, 40% solid content in methyl ethyl ketone solution, commercial available from Nissan Chemical Corp., Japan), 62 weight parts of reactive methacrylate-POSS-modified silica nanoparticles dispersion (MA4L35.01, silica nanoparticles with mean primary particle size of 20 nm, commercially available from Hybrid Plastics Inc. The US), 3.85 weight parts of perfluoropolyether-containing leveling agent (X-71-1203E, 20% solid content in methyl ethyl ketone solution, commercially available from Shin-Etsu Chemical Co., Ltd, Japan), 171 weight parts of n-butyl acetate (nBAC) were mixed and stirred for 1 hour to prepare a hard coating solution.

The hard coating solution was coated on a transparent polyimide film with a thickness of 30 μm, and then, the coating film was dried at 80° C. oven for 2 minutes and cured by exposing to an H lamp at a dosage of 298 mJ/cm$^2$ under nitrogen atmosphere to obtain a hard coating film with a thickness of 47 μm.

The light transmittance, haze, pencil hardness, abrasion resistance, adhesion and dynamic inward foldability of the obtained hard coating film were determined in accordance with the optical property measurement described hereinafter. The results are shown in table 1.

Example 2: Preparation of Hard Coating Film

The hard coating solution was prepared in a manner similar to Example 1, except that 637 weight parts of the reactive methacrylate-modified silica nanoparticles dispersion and 73 weight parts of the reactive methacrylate-POSS-modified silica nanoparticles dispersion were used.

The hard coating solution was coated on a transparent polyimide film with a thickness of 30 μm, and then, the coating film was dried at 80° C. oven for 2 minutes and cured by exposing to an H lamp at a dosage of 298 mJ/cm$^2$ under nitrogen atmosphere to obtain a hard coating film with a thickness of 48 μm.

The light transmittance, haze, pencil hardness, abrasion resistance, adhesion and dynamic inward foldability of the obtained hard coating film were determined in accordance with the optical property measurement described hereinafter. The results are shown in table 1.

Example 3: Preparation of Hard Coating Film

The hard coating solution was prepared in a manner similar to Example 1, except that 610 weight parts of the acrylate binder resin II, 778 weight parts of the reactive methacrylate-modified silica nanoparticles dispersion and 178 weight parts of the reactive methacrylate-POSS-modified silica nanoparticles dispersion were used.

The hard coating solution was coated on a transparent polyimide film with a thickness of 30 μm, and then, the coating film was dried at 80° C. oven for 2 minutes and cured by exposing to an H lamp at a dosage of 298 mJ/cm$^2$ under nitrogen atmosphere to obtain a hard coating film with a thickness of 48 μm.

The light transmittance, haze, pencil hardness, abrasion resistance, adhesion and dynamic inward foldability of the obtained hard coating film were determined in accordance with the optical property measurement described hereinafter. The results are shown in table 1.

Example 4: Preparation of Hard Coating Film

The hard coating solution was prepared in a manner similar to Example 1, except that 610 weight parts of the binder resin II, 556 weight parts of the reactive methacrylate-modified silica nanoparticles dispersion and 266 weight parts of the reactive methacrylate-POSS-modified silica nanoparticles dispersion were used.

The hard coating solution was coated on a transparent polyimide film with a thickness of 30 μm, and then, the coating film was dried at 80° C. oven for 2 minutes and cured by exposing to an H lamp at a dosage of 298 mJ/cm$^2$ under nitrogen atmosphere to obtain a hard coating film with a thickness of 47 μm.

The light transmittance, haze, pencil hardness, abrasion resistance, adhesion and dynamic inward foldability of the obtained hard coating film were determined in accordance with the optical property measurement described hereinafter. The results are shown in table 1.

Example 5: Preparation of Hard Coating Film

The hard coating solution was prepared in a manner similar to Example 1, except that 999 weight parts of the reactive methacrylate-modified silica nanoparticles dispersion and 200 weight parts of the reactive methacrylate-POSS-modified silica nanoparticles dispersion were used.

The hard coating solution was coated on a transparent polyimide film with a thickness of 30 μm, and then, the coating film was dried at 80° C. oven for 2 minutes and cured by exposing to an H lamp at a dosage of 298 mJ/cm$^2$ under nitrogen atmosphere to obtain a hard coating film with a thickness of 48 μm.

The light transmittance, haze, pencil hardness, abrasion resistance, adhesion and dynamic inward foldability of the obtained hard coating film were determined in accordance with the optical property measurement described hereinafter. The results shown in table 1.

Example 6: Preparation of Hard Coating Film

The hard coating solution was prepared in a manner similar to Example 1, except that 503 weight parts of the reactive methacrylate-modified silica nanoparticles dispersion and 67 weight parts of the reactive methacrylate-POSS-modified silica nanoparticles dispersion were used.

The hard coating solution was coated on transparent polyimide films with a thickness of 30 μm to form hard coating layers with different thickness thereon. Then, the coating films were dried at 80° C. oven for 2 minutes and cured by exposing to an H lamp at a dosage of 298 mJ/cm$^2$ under nitrogen atmosphere to obtain hard coating films with thickness of 55 μm, 47 μm, 44 μm, 43 μm, 36 μm, 33 μm and 32 μm, respectively.

The light transmittance, haze, pencil hardness, abrasion resistance, adhesion and dynamic inward foldability of the obtained hard coating films were determined in accordance with the optical property measurement described hereinafter. The results were shown in table 2.

Optical Property Measurement

The hard coating films obtained from the Examples were measured according to JIS test methods.

The light transmittance was measured according to the test method of JIS K7361 by NDH-2000 Haze Meter (manufactured by Nippon Denshoku Industries, Japan).

The haze was measured according to the test method of measuring the haze specified in JIS K7136 by NDH-2000 Haze Meter (manufactured by Nippon Denshoku Industries, Japan).

The pencil hardness was measured in accordance with the test of measuring the pencil hardness for hard coating film surface specified in JIS K5400. The pencil hardness test was performed by a pencil scratch hardness tester (Model: 553-M, manufactured by Yasuda Seiki Seisakusho Ltd., Japan) with a Mitsubishi hardness pencil under a load of 750 g and a movement at a speed of 1 mm/sec. Pencils with different hardness were used for measurement of pencil hardness and the hardness test was repeated. In case that two or more visible scratches were observed on the surface of the test sample, the hard coating film was deemed as failure. The maximum hardness used in the hardness test which with no scratch observed on the film surface was recorded.

Abrasion resistance measurement was performed by rubbing the surface of a hard coating film with a steel wool #0000 of 2×2 cm$^2$ under 1 Kg/cm$^2$ loads at a speed of 60 rpm. The rubbing was repeated and recorded the rubbing times that no scratch was visibly observed for every 250 times.

The hard coating films obtained from the Examples were conducted the adhesion test. The adhesion was tested by the cross-cut test according to JIS K 5600-5-6 to measure the adhesion between the hard coating layer and the base film.

Dynamic inward foldability measurement was performed by a rectangular sample of 10 mm×120 mm cut from each of the hard coating film. The short edges of the rectangular sample respectively fixed on the endurance testing machine (Mold: DLDMLH-FS, manufactured by Yuasa System Co. Ltd.) via tapes. The minimum distance between the two opposing edges was 2 mm, that is, the outer width of the bending part (Φ) was 2 mm, radius (R) was 1 mm. The sample with a hard coating layer facing inward was folded at an angle of 180° and then unfolded for 2×10$^5$ times and examined whether any crack or break was formed at the bending part. If no crack or break was formed at the bending part in the tests, the test sample marked as (○); if the formation of crack or break was observed at the bending part in the tests, the test sample marked as (x).

Dynamic outward foldability measurement was performed by a rectangular sample of 10 mm×120 mm cut from each of the hard coating film. The short edges of the rectangular sample respectively fixed on the endurance testing machine (Mold: DLDMLH-FS, manufactured by Yuasa System Co. Ltd.) via tapes. The minimum distance between the two opposing edges was 2 mm, 4 mm, 6 mm, 8 mm or 10 mm, that is the outer width of the bending part (Φ): 2 mm, 4 mm, 6 mm, 8 mm or 10 mm, radius (R) was 1 mm, 2 mm, 3 mm, 4 mm or 5 mm. The sample with base film facing inward was folded at an angle of 180° and then unfolded for 2×10$^5$ times and examined whether any crack or break was formed at the bending part. If no crack or break was formed at the bending part in tests, the test sample marked as (○); if the formation of crack or break was observed at the bending part in the tests, the test sample marked as (x).

TABLE 1

The properties of the hard coating layers of Examples 1 to 6

| Example | Thickness (μm) | Haze (%) | Light Transmittance (%) | Hardness | Abrasion Resistance | Adhesion | Inward foldability 2 × 10$^5$ times R = 1 mm |
|---|---|---|---|---|---|---|---|
| Example 1 | 47 | 0.52 | 91.08 | 8H | 1500 times | 100/100 | ○ |
| Example 2 | 48 | 0.42 | 91.21 | 8H | 1000 times | 100/100 | ○ |
| Example 3 | 48 | 0.56 | 91.32 | 8H | 1000 times | 100/100 | ○ |
| Example 4 | 47 | 1.00 | 91.29 | 8H | 1000 times | 100/100 | ○ |
| Example 5 | 48 | 0.42 | 91.37 | 7H | 500 times | 100/100 | ○ |
| Example 6 | 47 | 0.47 | 91.00 | 8H | 1500 times | 100/100 | ○ |

TABLE 2

The properties of the hard coating film with different thickness obtained in Example 6

| Thickness (μm) | Haze (%) | Light Transmittance (%) | Hardness | Adhesion | Inward foldability 2 × 10$^5$ times R = 1 mm | Outward foldability 2 × 10$^5$ times R | result |
|---|---|---|---|---|---|---|---|
| 55 | 0.59 | 91.01 | 9H | 100/100 | ○ | 5 mm | ○ |
| 47 | 0.47 | 91.00 | 8H | 100/100 | ○ | 4 mm | ○ |

TABLE 2-continued

The properties of the hard coating film with different thickness obtained in Example 6

| Thickness (μm) | Haze (%) | Light Transmittance (%) | Hardness | Adhesion | Inward foldability 2 × 10⁵ times R = 1 mm | Outward foldability 2 × 10⁵ times R | result |
|---|---|---|---|---|---|---|---|
| 44 | 0.45 | 91.15 | 8H | 100/100 | ○ | 3 mm | ○ |
| 43 | 0.45 | 91.17 | 7H | 100/100 | ○ | 3 mm | ○ |
| 36 | 0.39 | 91.42 | 6H | 100/100 | ○ | 2 mm | ○ |
| 33 | 0.35 | 91.39 | 6H | 100/100 | ○ | 2 mm | ○ |
| 32 | 0.31 | 91.40 | 6H | 100/100 | ○ | 1 mm | ○ |

The high hardness flexible hard coating films obtained from Examples 1 to 6 of the present invention have a haze of 1% or below, a high hardness and inward foldability. Furthermore, the disclosed high hardness flexible hard coating film have high hardness in a low thickness and passes the dynamic inward foldablilty test (R=1 mm) at an angle of 180° for 2×10⁵ times and the dynamic outward foldablilty test (R=1 mm) at an angle of 180° for 2×10⁵ times.

In accordance with the high hardness flexible hard coating film of the above-mentioned examples, the present invention further provides a display comprising the high hardness flexible hard coating film.

While the invention has been described by way of example(s) and in terms of the embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A high hardness flexible hard coating film comprising a base film; and
a hard coating layer comprising an acrylate binder resin and reactive silica nanoparticles;
wherein the reactive silica nanoparticles comprises reactive (meth)acrylate-modified silica nanoparticles and reactive (meth)acrylate-polyhedral oligomeric silsesquioxane (POSS)-modified silica nanoparticles.

2. The high hardness flexible hard coating film as claimed in claim 1, wherein the reactive silica nanoparticles in the hard coating layer comprises 20 weight percent (wt %) to 40 wt % of reactive (meth)acrylate-modified silica nanoparticles and 5 wt % to 40 wt % of reactive (meth)acrylate-POSS-modified silica nanoparticles, and the total amount of the reactive silica nanoparticles is in the range of 30 wt % to 60 wt %.

3. The high hardness flexible hard coating film as claimed in claim 1, wherein the mean primary particle diameter by specific surface area (BET) of the reactive (meth)acrylate-modified silica nanoparticles in the hard coating layer is in the range of 10 nm to 70 nm.

4. The high hardness flexible hard coating film as claimed in claim 1, wherein the mean primary particle diameter of the (meth)acrylate-POSS-modified silica nanoparticles in the hard coating layer is in the range of 10 nm to 60 nm.

5. The high hardness flexible hard coating film as claimed in claim 1, wherein the thickness of the hard coating layer is in the range between 2 μm to 30 μm.

6. The high hardness flexible hard coating film as claimed in claim 1, wherein the acrylic binder resin comprises a (meth)acrylate composition and an initiator, wherein the (meth)acrylate composition comprises an urethane (meth)acrylate oligomer with a functionality of 6 to 15; a (meth)acrylate monomer with a functionality of 3 to 6; and a (meth)acrylate monomer with a functionality of less than 3, wherein the average molecular weight of the urethane (meth)acrylate oligomer is between 1,000 and 4,500.

7. The high hardness flexible hard coating film as claimed in claim 6, wherein the (meth)acrylate composition of the acrylate binder resin comprises 35 to 50 weight parts of the urethane (meth)acrylate oligomer with a functionality of 6 to 15, 12 to 20 weight parts of the at least one (meth)acrylate monomer with a functionality of 3 to 6, and 1.5 to 12 weight parts of the at least one (meth)acrylate monomer with a functionality of less than 3.

8. The high hardness flexible hard coating film as claimed in claim 6, wherein the urethane (meth)acrylate oligomer with a functionality of 6 to 15 is an aliphaticurethane (meth)acrylate oligomer.

9. The high hardness flexible hard coating film as claimed in claim 6, wherein the (meth)acrylate monomer with a functionality of 3 to 6 is selected from at least one of the group consisting of pentaerythritol tetra(meth)acrylate (PETT(M)A), dipentaerythritol penta(meth)acrylate (DPP(M)A), dipentaerythritol hexa(meth)acrylate (DPH(M)A), trimethylolpropane tri(meth)acrylate (TMPT(M)A), ditrimethylolpropane tetra(meth)acrylate (DTMPT(M)A), pentaerythritol tri(meth)acrylate (PET(M)A) and the combination thereof.

10. The high hardness flexible hard coating film as claimed in claim 6, wherein the (meth)acrylate monomer with functionality of less than 3 is selected from at least one of the group consisting of 2-ethylhexyl (meth)acrylate (2-EH(M)A), 2-hydroxyethyl (meth)acrylate (2-HE(M)A), 2-hydroxypropyl (meth)acrylate (2-HP(M)A), 2-hydroxybutyl (meth)acrylate (2-HB(M)A), 2-butoxyethyl (meth)acrylate, 1,6-hexanediol di(meth)acrylate (HDD(M)A), cyclic trimethylolpropane formal (meth)acrylate (CTF(M)A), 2-phenoxyethyl (meth)acrylate (PHE(M)A), tetrahydrofurfuryl (meth)acrylate (THF(M)A), lauryl (meth)acrylate (L(M)A), diethylene glycol di(meth)acrylate (DEGD(M)A), dipropylene glycol di(meth)acrylate (DPGD(M)A), tripropylene glycol di(meth)acrylate (TPGD(M)A) and isobornyl (meth)acrylate (IBO(M)A) and a combination thereof.

11. The high hardness flexible hard coating film as claimed in claim 6, wherein the initiator is selected from at least one of the group consisting of acetophenones, diphenylketones, propiophenones, benzophenones, α-hydroxyketones, fluorenylphosphine oxides and the combination thereof.

12. A display comprising a high hardness flexible hard coating film as claimed in claim 1.

* * * * *